(12) United States Patent
Tsuo (10) Patent No.: US 8,385,058 B2
(45) Date of Patent: Feb. 26, 2013

(54) DISPLAY DEVICE AND ELECTRIC DEVICE

(75) Inventor: Chun-Jung Tsuo, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 1131 days.

(21) Appl. No.: 11/853,077

(22) Filed: Sep. 11, 2007

(65) Prior Publication Data

US 2008/0062663 A1   Mar. 13, 2008

(30) Foreign Application Priority Data

Sep. 12, 2006  (CN) .......................... 2006 1 0127532

(51) Int. Cl.
*H05K 5/00* (2006.01)

(52) U.S. Cl. .................... 361/679.21; 361/752
(58) Field of Classification Search .................. 361/752, 361/679.21
See application file for complete search history.

(56) References Cited

U.S. PATENT DOCUMENTS

| | | | | |
|---|---|---|---|---|
| 2,898,585 A | * | 8/1959 | Bauman ........................ | 348/839 |
| 4,388,671 A | * | 6/1983 | Hall et al. ................. | 361/679.61 |
| 4,581,654 A | * | 4/1986 | Kobayashi et al. ........... | 348/790 |
| 5,023,726 A | * | 6/1991 | Campisi ........................ | 348/839 |
| RE34,369 E | * | 9/1993 | Darden et al. ................ | 439/377 |
| 5,402,310 A | * | 3/1995 | Penniman ................ | 361/679.43 |
| 5,411,333 A | * | 5/1995 | Hoffman ........................ | 384/18 |
| 5,477,415 A | * | 12/1995 | Mitcham et al. ......... | 361/679.42 |
| 5,575,545 A | | 11/1996 | Wang | |
| 5,619,398 A | * | 4/1997 | Harrison et al. .......... | 361/679.43 |
| 5,621,611 A | * | 4/1997 | Kizuya et al. ............ | 361/679.22 |
| 5,738,536 A | * | 4/1998 | Ohgami et al. ............... | 439/142 |
| 5,801,542 A | * | 9/1998 | Kajiwara et al. ......... | 324/756.02 |
| 5,822,181 A | * | 10/1998 | Jung .......................... | 361/679.6 |
| 6,098,131 A | * | 8/2000 | Unger et al. .................. | 710/303 |
| 6,233,026 B1 | | 5/2001 | Kim et al. | |
| 6,373,707 B1 | * | 4/2002 | Hutchins ....................... | 361/725 |
| 6,407,930 B1 | * | 6/2002 | Hsu ............................... | 361/784 |
| 6,900,857 B2 | * | 5/2005 | Mai ............................... | 349/58 |
| 6,950,311 B1 | * | 9/2005 | DeCesare et al. ............. | 361/727 |
| 7,206,201 B2 | * | 4/2007 | Behl et al. ................ | 361/679.48 |
| 7,804,681 B2 | * | 9/2010 | Wu et al. ................... | 361/679.21 |
| 2002/0047829 A1 | * | 4/2002 | Sun et al. ...................... | 345/156 |
| 2002/0109802 A1 | * | 8/2002 | Cheng et al. ................... | 349/58 |
| 2002/0113533 A1 | * | 8/2002 | Devine ..................... | 312/334.46 |
| 2003/0016494 A1 | * | 1/2003 | Chen ............................. | 361/687 |

(Continued)

FOREIGN PATENT DOCUMENTS

CN            2484721        4/2002

OTHER PUBLICATIONS

English abstract of CN2484721, pub. Apr. 3, 2002.

*Primary Examiner* — Timothy Thompson
*Assistant Examiner* — Nathan Milakovich (57) ABSTRACT

A display device and an electronic device are provided. The display device includes at least a circuit board, a frame and a sliding circuit board module. The frame has a receiving space and an opening. The sliding circuit board module is used for carrying the circuit board. The sliding circuit board module is movably coupled with the frame, such that the sliding circuit board module can slide both inside and outside of the receiving space via the opening. The sliding circuit board module comprises a bottom board and a lateral board. The bottom board is used for carrying the circuit board. The lateral board is coupled with the bottom board, wherein the lateral board and the bottom board substantially form an L-shaped structure. The lateral board has a first lateral board through hole for exposing a first connecting port of the circuit board.

17 Claims, 6 Drawing Sheets

U.S. PATENT DOCUMENTS

| | | | |
|---|---|---|---|
| 2003/0086029 A1* | 5/2003 | Lin et al. | 349/58 |
| 2005/0059298 A1* | 3/2005 | Lin et al. | 439/607 |
| 2006/0041783 A1* | 2/2006 | Rabinovitz | 714/6 |
| 2006/0186290 A1* | 8/2006 | Carnevali | 248/221.11 |
| 2006/0250540 A1* | 11/2006 | Wellhofer | 349/58 |
| 2007/0064378 A1* | 3/2007 | Lo et al. | 361/681 |
| 2007/0091659 A1* | 4/2007 | Lin et al. | 363/127 |
| 2007/0139579 A1* | 6/2007 | Zhang | 349/58 |
| 2007/0153454 A1* | 7/2007 | Chang et al. | 361/681 |
| 2007/0273602 A1* | 11/2007 | Zhu et al. | 343/841 |
| 2008/0230437 A1* | 9/2008 | Ou et al. | 206/701 |
| 2008/0303946 A1* | 12/2008 | Cox et al. | 348/552 |

\* cited by examiner

DISPLAY DEVICE AND ELECTRIC DEVICE

This application claims the benefit of People's Republic of China application Serial No. 200610127532.7, filed Sep. 12, 2006, the subject matter of which is incorporated herein by reference.

BACKGROUND OF THE INVENTION

1. Field of the Invention

The invention relates in general to a display device and an electronic device, and more particularly to a display device having a sliding circuit board module and an electronic device.

2. Description of the Related Art

As science and technology advance rapidly, a variety of display devices capable of displaying audio/video data and text messages are presented and widely applied in modern people's everydayness. Conventional display device includes at least a circuit board, a front casing, a back casing, a display panel and a frame, wherein the display panel is disposed between a front casing and a back casing, and the frame is used for carrying the circuit board.

The assembly of conventional display device includes the following steps. Firstly, a plurality of screws are used for fixing the circuit board on the frame. Next, the frame is inverted such that the circuit board is disposed between the frame and the display panel. The electronic elements on the circuit board might be collided by external objects. Then, the frame and the display panel are screwed together.

Many testing procedures are involved during the process of manufacturing a display device. The most commonly seen defect is that a certain electronic element on the circuit board is out of order. However, when the personnel would like to test and repair the circuit board, the frame must be detached from the display panel first. As the frame is too big, the personnel have to detach the circuit board from the frame for repair. After the repair is completed, the circuit board and the frame are assembled back to the display device in an inverted order. As the above steps are tedious and time-consuming, some problems arise.

Firstly, the repair time is too long. The personnel have to detach the frame from the display panel first and detach the circuit board from the frame next. These movements are tedious and take a lot of repair time.

Secondly, too much labor costs are wasted. In the production line, the repair labor is relatively expensive than other labors. The more repair time is spent at a defect, the more repair labor and repair hours have to be inputted, wasting a lot of labor costs.

Thirdly, product scratches occur easily. The more movements the person spent for each defect, the more likely the product will be scratched. As a result, more defects will occur.

Apart from display device, other electronic devices having a circuit board also have the same problems. Therefore, how to develop a display device and an electronic device free of the above problems has become an imminent issue to be resolved.

SUMMARY OF THE INVENTION

The invention is directed to a display device and an electronic device. A sliding circuit board module is used for carrying the circuit board. The repair personnel can slide the sliding circuit board module out of the frame for repair, such that the display device and the electronic device have the advantages of reducing repair time, labor costs and the occurrence of scratches.

According to a first aspect of the present invention, a display device is provided. The display device includes at least a circuit board, a frame and a sliding circuit board module. The frame has a receiving space and an opening. The sliding circuit board module is used for carrying the circuit board. The sliding circuit board module is movably coupled with the frame, such that the sliding circuit board module can slides both inside and outside of the receiving space via the opening. The sliding circuit board module includes a bottom board and a lateral board. The bottom board is used for carrying the circuit board. The lateral board is coupled with the bottom board, wherein the lateral board and the bottom board substantially form an L-shaped structure. The lateral board has a first lateral board through hole for exposing a first connecting port of the circuit board.

According to a second aspect of the present invention, an electronic device is provided. The electronic device includes at least a circuit board, a frame, a sliding circuit board module, a front casing and a back casing. The frame has a receiving space and an opening. The sliding circuit board module is used for carrying the circuit board. The sliding circuit board module is movably coupled with the frame, such that the sliding circuit board module can slides both inside and outside of the receiving space via the opening. The back casing is coupled with the front casing. The frame is clamped between the front casing and the back casing. The sliding circuit board module includes a bottom board and a lateral board. The bottom board is used for carrying the circuit board. The lateral board is coupled with the bottom board, wherein the lateral board and the bottom board substantially form an L-shaped structure. The lateral board has a first lateral board through hole for exposing a first connecting port of the circuit board.

The invention will become apparent from the following detailed description of the preferred but non-limiting embodiments. The following description is made with reference to the accompanying drawings.

DETAILED DESCRIPTION OF THE INVENTION

First Embodiment

Figure 1:
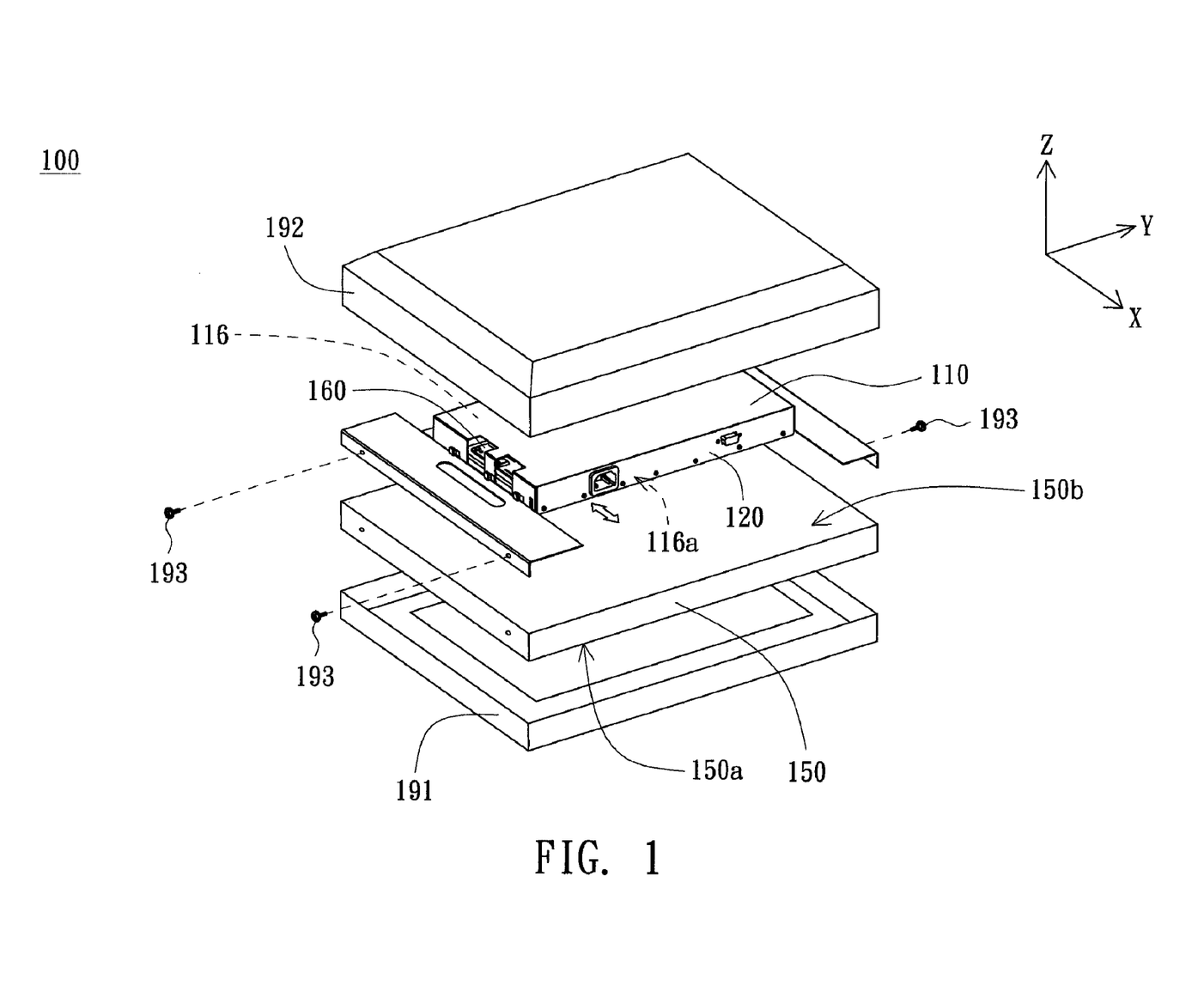
FIG. 1 is a perspective of a display device according to a first embodiment of the invention.

Referring to FIG. 1, a perspective of a display device 100 according to a first embodiment of the invention is shown. The display device 100 includes at least a circuit board 160, a display panel 150, a frame 110 and a sliding circuit board module 120. The display panel 150 has a display side 150a and a back side 150b corresponding to the display side 150a. The display side 150a is used for displaying an image. The frame 110 disposed on the back side 150b has a receiving space 116 and an opening 116a. The sliding circuit board module 120 is used for carrying the circuit board 160. The sliding circuit board module 120 is movably coupled with the frame 110 such that the sliding circuit board module 120 can slide both inside and outside of the receiving space 116 via the opening 116a.

Examples of the display panel 150 include liquid crystal display panel (LCD panel), organic electroluminescent device panel (OELD panel) and plasma display panel (PDP). In the present embodiment of the invention, the display panel 150 is exemplified by an LCD panel and the display device 100 is exemplified by a liquid crystal TV.

Figure 2:
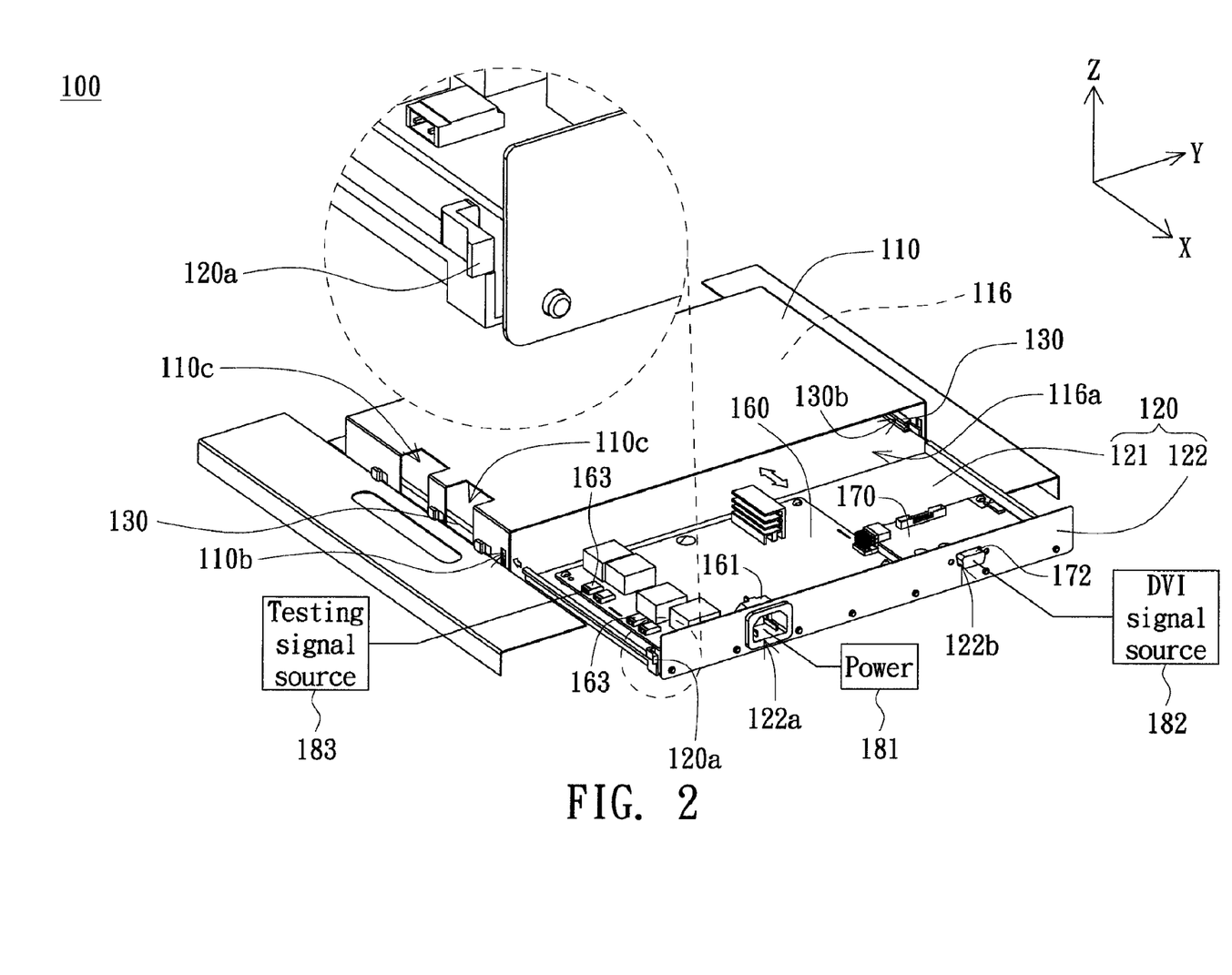
FIG. 2 is a perspective of the sliding circuit board module of FIG. 1 sliding out of the receiving space.
Figure 3:
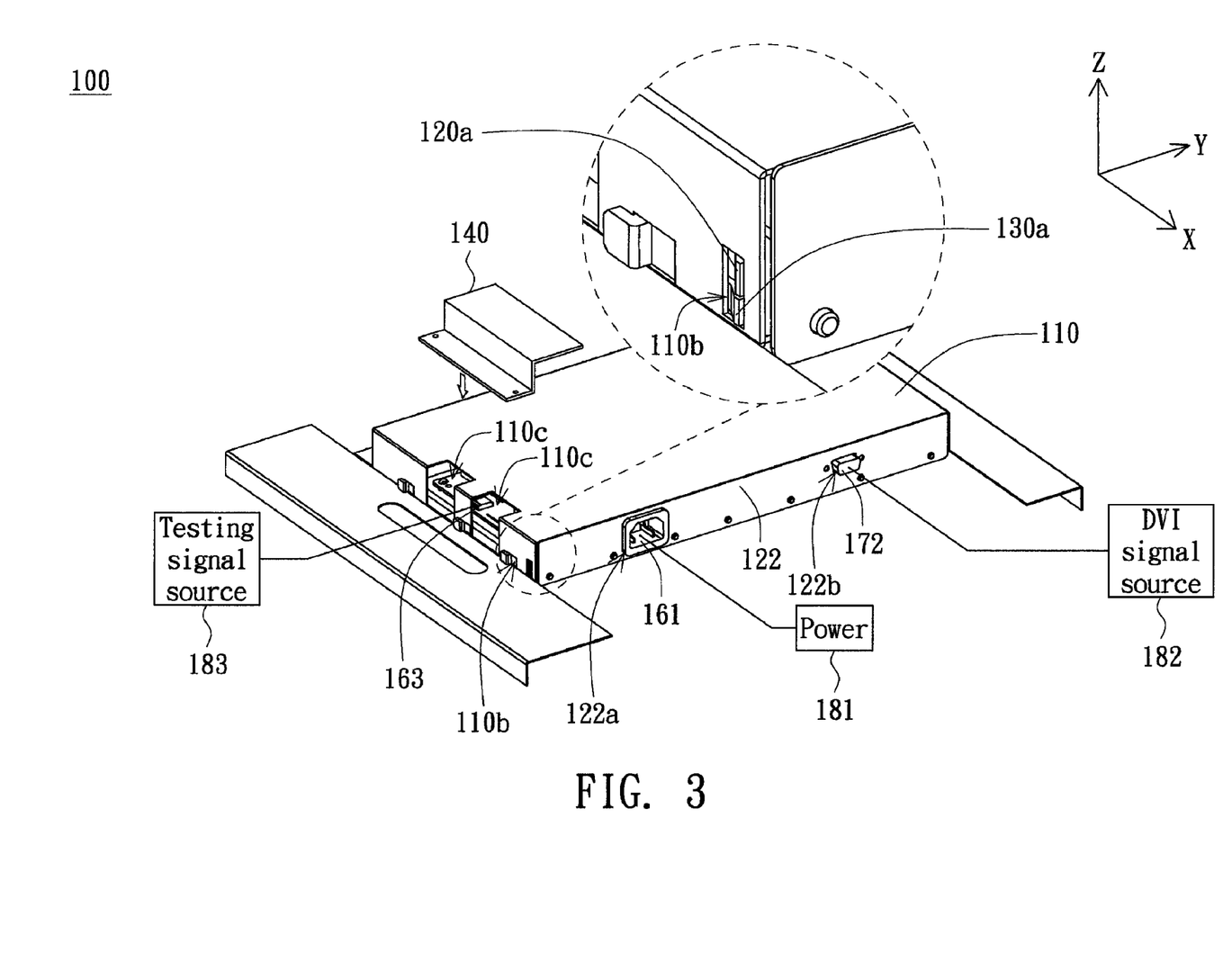
FIG. 3 is a perspective of the sliding circuit board module of FIG. 1 sliding into the receiving space.

Referring to both FIG. 2 and FIG. 3. FIG. 2 is a perspective of the sliding circuit board module 120 of FIG. 1 sliding out of the receiving space 116. FIG. 3 is a perspective of the sliding circuit board module 120 of FIG. 1 sliding into the receiving space 116. As indicated in FIG. 2, the sliding circuit board module 120 is disposed outside the receiving space 116 for exposing the circuit boards 160 and 170 disposed on the sliding circuit board module 120. As indicated in FIG. 3, when the sliding circuit board module 120 slides inwards via the opening 116a, the circuit board 160 and the circuit board 170 are received inside the receiving space 116.

As indicated in FIG. 2, in the present embodiment of the invention, the sliding circuit board module 120 is used for carrying the circuit board 160 and the circuit board 170. The circuit board 160 is used for receiving an external power, stabilizing the power and providing appropriate power to other electronic elements. The circuit board 160 includes a first connecting port 161 and a third connecting port 163. The first connecting port 161 is coupled with a power 181, and the third connecting port 163 is coupled with a testing signal source 183.

Besides, the circuit board 170 is used for receiving a digital visual interface (DVI) signal so as to receive an audio/video data or text message. The circuit board 170 includes a second connecting port 172 coupled with a DVI signal source 182 such as a computer host, a notebook computer or a projector.

As indicated in FIG. 2, the sliding circuit board module 120 includes a bottom board 121 and a lateral board 122. The bottom board 121 is used for carrying the circuit board 160 and the circuit board 170. The lateral board 122 is coupled with the bottom board 121. The bottom board 121 and the lateral board 122 substantially form an L-shaped structure. The lateral board 122 has a first lateral board through hole 122a and a second lateral board through hole 122b. The first lateral board through hole 122a is for exposing the first connecting port 161, and the second lateral board through hole 122b of the circuit board 160 is for exposing the second connecting port 172 of the circuit board 170.

As indicated in FIG. 3, when the user slides the sliding circuit board module 120 into the receiving space 116, the circuit board 160 and the circuit board 170 are received inside the receiving space 116, and the first connecting port 161 and the second connecting port 172 are projected outside the lateral board 122 via the first lateral board through hole 122a and the second lateral board through hole 122b respectively. The user still can connect the plug of the power 181 and the plug of the DVI signal source 182 to the first connecting port 161 and the second connecting port 172 respectively.

The frame 110 further has a testing through hole 110c for exposing a third connecting port 163 of the circuit board 160. The third connecting port 163 is connected to a testing signal source 183. As indicated in FIG. 2, when the user slides the sliding circuit board module 120 into the receiving space 116, the testing through hole 110c exactly exposes the third connecting port 163 of the circuit board 160. During the assembly process, the third connecting port 163 is connected to a testing signal source 183 such as a lamp for lamp testing. When the sliding circuit board module 120 of the invention slides into the receiving space 116, the circuit board 160 and the circuit board 170 are received inside the receiving space 116. With the design of the testing through hole 110c, the display device 100 is capable of performing necessary tests.

The display device 100 further includes a shading case 140 for covering the testing through hole 110c. After the necessary testing procedures of the display device 100 are completed, the testing through hole 110c is covered by the shading case 140 lest the electronic elements of the circuit board 160 and the circuit board 170 might be affected by electrostatic charges.

Figure 4:
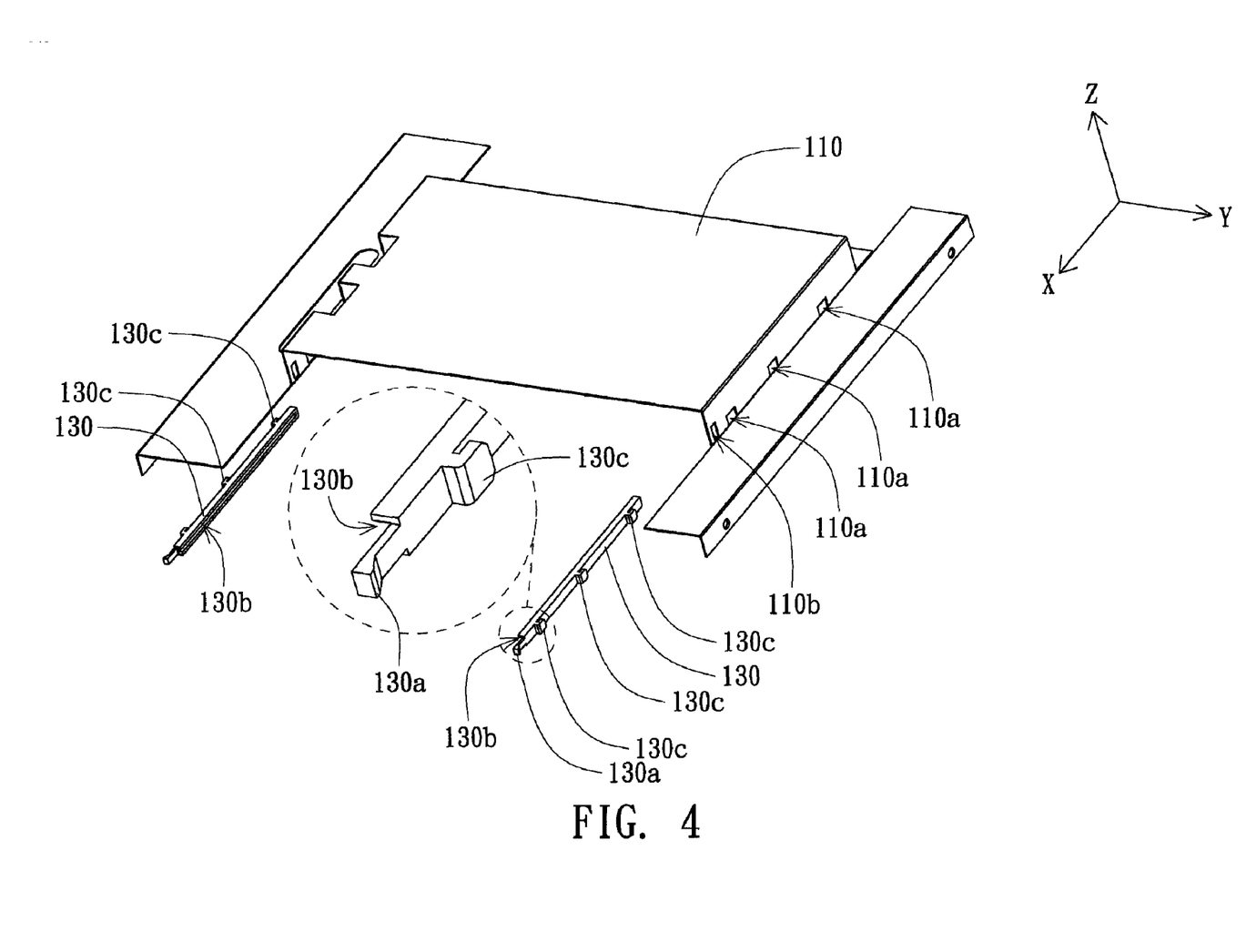
FIG. 4 is an exploded diagram of the slide tracks and the frame of FIG. 2.
Figure 5:
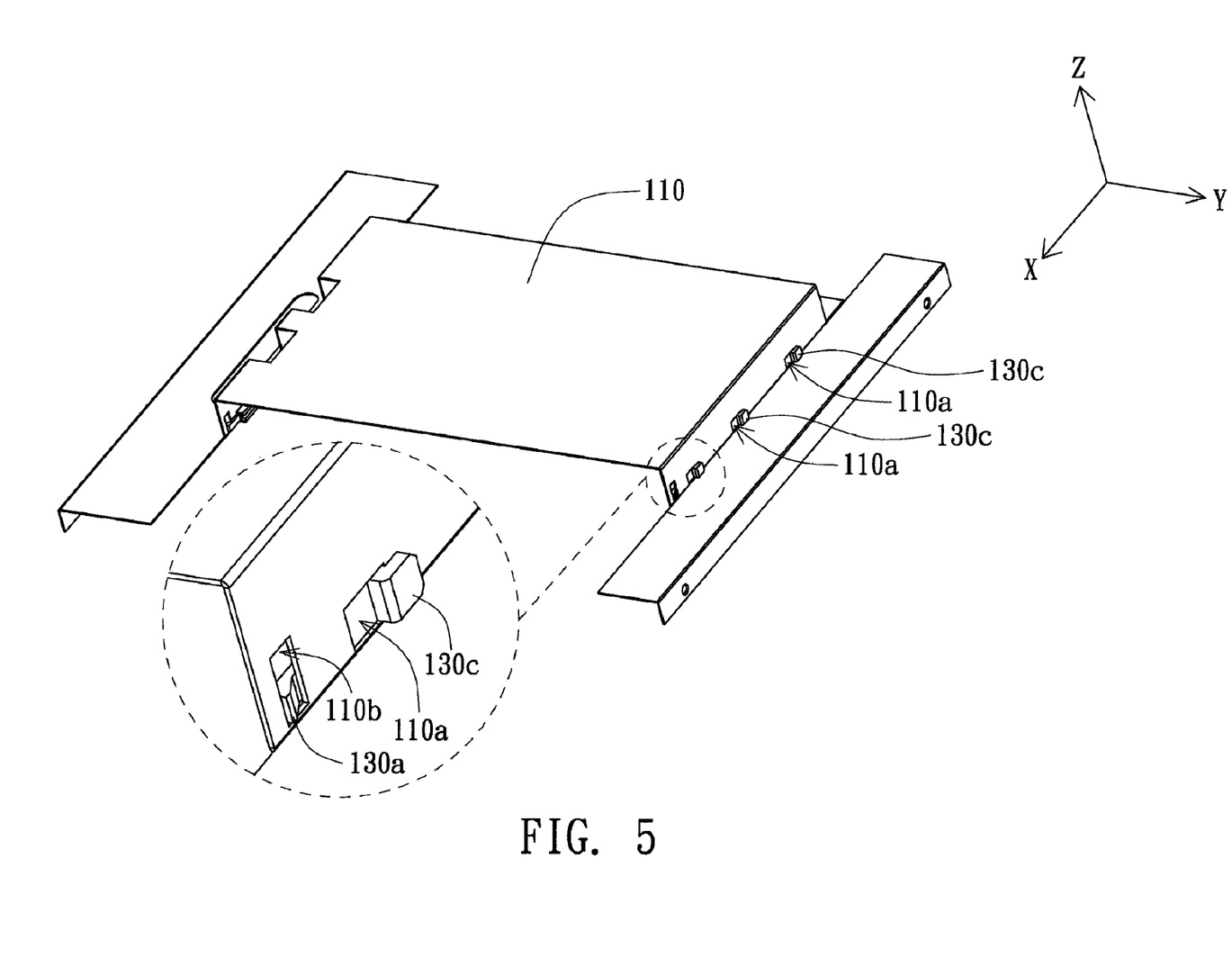
FIG. 5 is a perspective of the slide tracks engaged with the frame of FIG. 4.

Referring to both FIG. 4 and FIG. 5. FIG. 4 is an exploded diagram of the slide tracks 130 and the frame 110 of FIG. 2. FIG. 5 is a perspective of the slide tracks 130 engaged with the frame 110 of FIG. 4. The display device 100 further includes two slide tracks 130 engaged with two opposite sides of the frame 110. Each slide track 130 has a sliding slot 130b, and the sliding circuit board module 120 is embedded into the sliding slots 130b. The sliding circuit board module 120 slides along the slide tracks 130 and can slides both inside and outside of the receiving space of the first connecting port 161 via the opening 161a (illustrated in FIG. 2).

The assembly procedures of the display device 100 are stated below. Firstly, the circuit board 160 and the circuit board 170 are disposed on the bottom board 121, and the lateral board 122 is assembled, wherein the lateral board 122 exposes the first connecting port 161 and the second connecting port 172. Next, the slide tracks 130 are engaged with two opposite sides of the frame 110. Then, the sliding circuit board module 120 slides into the receiving space 116 along the slide tracks 130. After the sliding circuit board module 120 slides into the receiving space 116, the sliding circuit board module 120 is engaged with the frame 110.

As for how the slide tracks 130 are engaged with the frame 110 and how the sliding circuit board module 120 is engaged with the frame 110 are stated below.

Referring to FIG. 4 and FIG. 5 again. Each slide track 130 has at least an engaging hook 130c, and the frame 110 has at least two engaging holes 110a. Each engaging hook 130 is engaged with a corresponding engaging hole 110a, such that the slide track 130 is engaged with the frame 110. In the present embodiment of the invention, each slide track 130 has three engaging hooks 130c, and the frame 110 has six engaging holes 110a. The engaging hook 130c is an L-shaped bump, and when the engaging hook 130c is engaged with the corresponding engaging hole 110a, the slide track 130 is restricted and can only slide towards the positive X-axis direction.

Each slide track 130 further has a first positioning bump 130a, and the frame 110 further has two positioning holes 110b. When the slide track 130 is engaged with the frame 110, the first positioning bump 130a is embedded into a corresponding positioning hole 110b. Meanwhile, the slide track 130 cannot slide towards the positive X-axis direction, such that the slide track 130 is positioned.

Referring to FIG. 2 and FIG. 3 again. The sliding circuit board module 120 has two second positioning bumps 120a. When the sliding circuit board module 120 slides into the receiving space 116, the second positioning bumps 120a are embedded into corresponding positioning holes 110b. Meanwhile, the sliding circuit board module 120 is restricted and can only slide towards the positive X-axis direction, such that the sliding circuit board module 120 is positioned.

The second positioning bump 120a is a suspended arm structure. When the repair personnel would like to repair the circuit board 160 or the circuit board 170, the repair personnel can slide the sliding circuit board module 120 out of the receiving space 116 by pressing the second positioning bump 120a. The repair personnel can withdraw the entire sliding circuit board module 120 for repair without loosing any screws or detaching the circuit board 160, the circuit board 170 or the frame 110, hence the repair is made much easier.

As indicated in FIG. 1, the display device 100 further includes a front casing 191 and a back casing 192, and the back casing 192 is coupled with the front casing 191. The frame 110 is engaged with the display panel 150 or the front casing 191 via the screw 193. In the present embodiment of the invention, the frame 110 is engaged with the display panel 150, and the display panel 150 and the frame 110 are clamped between the front casing 191 and the back casing 192.

If the frame 110 is engaged on the front casing 191, then the display panel 150 is clamped between the frame 110 and the front casing 191. No matter the frame 110 is engaged on the front casing 191 or the display panel 150, the technology of the display device is still within the scope of the invention.

As disclosed above, the display device 100 of the invention has a structure-strengthened frame 110 and improves repair convenience by using a sliding circuit board module 120, such that the display device 100 is further competitive in the market.

Second Embodiment

Figure 6:
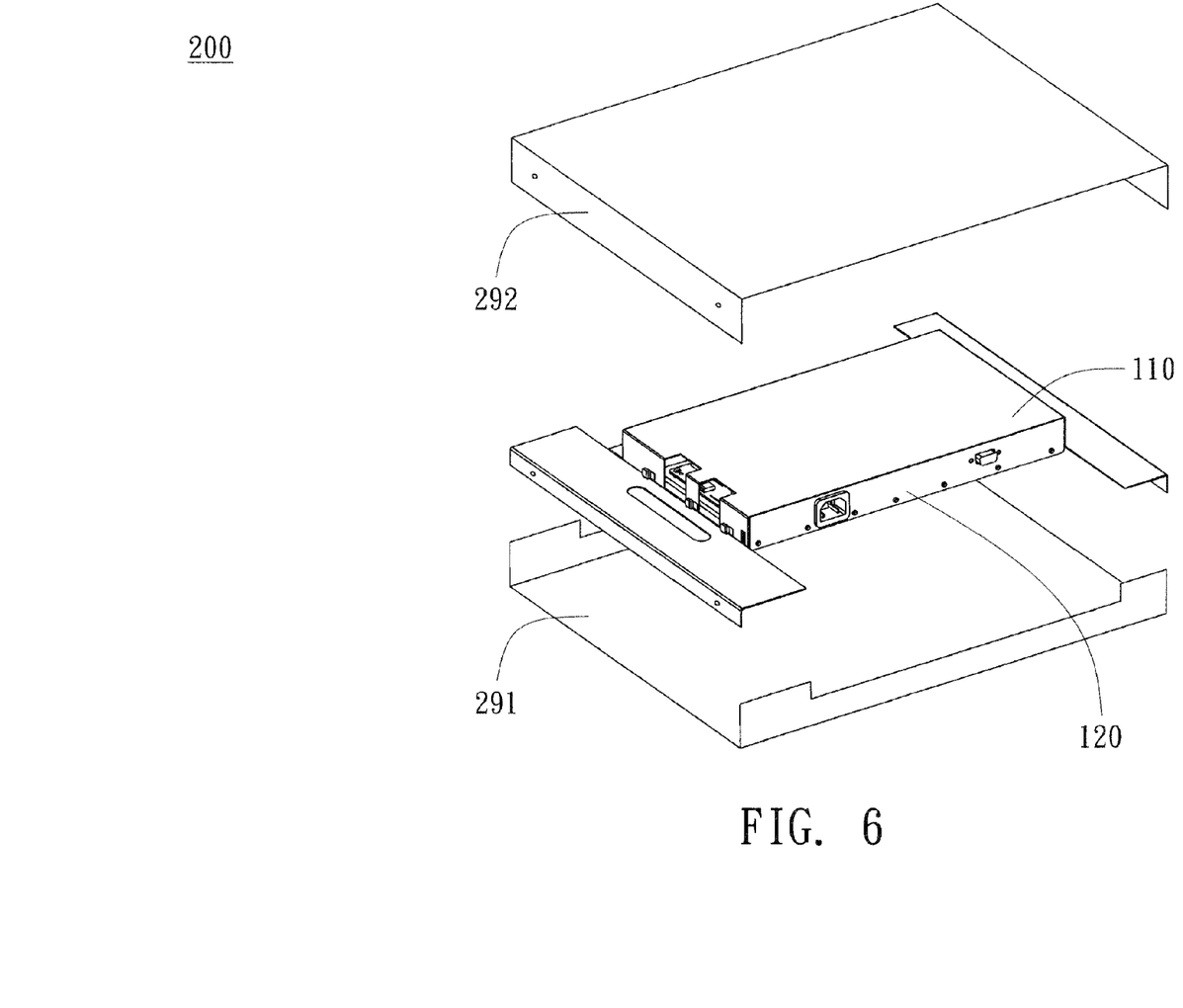
FIG. 6 is a perspective of the electronic device according to a second embodiment of the invention.

In the present embodiment of the invention, the electronic device 200 uses the frame 110 and the sliding circuit board module 120 of the first embodiment, and the similarities are not repeated. Referring to FIG. 6, a perspective of the electronic device 200 according to a second embodiment of the invention is shown. The electronic device 200 includes at least a circuit board (not illustrated in FIG. 6), a frame 110, a sliding circuit board module 120, a front casing 291 and a back casing 292. The back casing 292 is coupled with the front casing 291. The frame 110 is clamped between the front casing 291 and the back casing 292.

Examples of the electronic device 200 include video recorder, mobile phone personal digital assistant (PDA), computer host and projector. In the present embodiment of the invention, as indicated in FIG. 6, the electronic device 200 is exemplified by a video recorder.

When the repair personnel would like to repair the circuit board, the repair personnel only need to slide the sliding circuit board module 120 out of the frame 110 for repair, largely increasing the convenience when servicing the electronic device 200.

According to the embodiments disclosed above, the display device 100 and the electronic device 200 enables the sliding circuit board module 120 to slide with respect to the frame 110 by means of two slide tracks 130; however the number of slide tracks 130 are not for limiting the invention. Furthermore, the slide tracks 130 can be disposed between the sliding circuit board module 120 and the frame 110 via a variety of sliding mechanisms such as gear mechanism, bearing mechanism, or slider mechanism. Any mechanical designs enabling the sliding circuit board module 120 to slide with respect to the frame 110 are within the scope of technology of the invention.

According to the display device and the electronic device disclosed in the above embodiments, a sliding circuit board module is used for carrying the circuit board. The repair personnel can directly slide the sliding circuit board module out of the frame for repair, therefore the display device and the electronic device have the following advantages:

Firstly, the assembly time is shortened. During the process of assembling the slide tracks, the slide tracks are engaged with two opposite side of the frame without using any screws, which is very convenient and saves a lot of assembly time.

Secondly, the repair time is shortened. By pressing the second bump, the repair personnel can detach the sliding circuit board module and withdraw the entire the sliding circuit board module for repair without loosing any screws or detaching the circuit board and the frame, largely shortening the repair time for the repair personnel.

Thirdly, the convenience of repair and testing is increased. During the process of repair and testing, after the sliding circuit board module is withdrawn from the display device, the sliding circuit board module is electrically connected to the power or signal source for repair or testing via a first connecting port, a second connecting port or a third connecting port without having to design any specific accessories, saving the trouble of assembling the circuit board with the accessories and the manufacturing cost of the accessories.

Fourthly, the labor cost is reduced. By shortening the repair time required for servicing a defect, the productivity of the repair personnel is increased. That is, the repair personnel can repair more items per time unit, hence reducing the personnel of the repair team and further bringing labor cost down.

Fifthly, the occurrence of product scratches is reduced. As the repair procedure is simplified, unnecessary movements are omitted, hence reducing the occurrence of product scratches.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
   a circuit board, comprising a power circuit board and an image circuit board;
   a display panel having a display side and a back side corresponding to the display side;
   a frame disposed on the back side of the display panel having a receiving space and an opening for exposing the power circuit board and the image circuit board; and
   a sliding circuit board module used for carrying the circuit board, wherein the sliding circuit board module is movably coupled with the frame, such that the sliding circuit board module can slide both inside and outside of the receiving space via the opening, the sliding circuit board module slides outside of the receiving space via the opening for exposing the power circuit board and the image circuit board, and the sliding circuit board module has a sliding direction parallel to a surface of the display side of the display panel, the sliding circuit board module comprising:
   a bottom board used for carrying the circuit board; and
   a lateral board coupled with the bottom board, wherein the lateral board and the bottom board substantially form an L-shaped structure, and the lateral board has a first lateral board through hole for exposing a first connecting port of the circuit board and a second lateral board through hole for exposing a second connecting port of the circuit board, wherein the first lateral board through hole is coupled with the power circuit board, and the second lateral board through hole is coupled with the image circuit board.

2. The display device according to claim 1, further comprising:

a sliding mechanism disposed between the frame and the sliding circuit board module, such that the sliding circuit board module slides with respect to the frame.

3. The display device according to claim 1, further comprising:
two slide tracks engaged with two opposite sides of the frame, wherein each slide track has a sliding slot, and the sliding circuit board module is embedded into the sliding slots, such that the sliding circuit board module slides along the slide tracks.

4. The display device according to claim 3, wherein each slide track has at least an engaging hook, the frame has at least two engaging holes, and each engaging hook is engaged with a corresponding engaging hole, such that the slide tracks are engaged with the frame.

5. The display device according to claim 3, wherein each slide track further has a first positioning bump, the frame further has two positioning holes, and when the slide tracks are engaged with the frame, the first positioning bumps are embedded into corresponding positioning holes for positioning the slide tracks.

6. The display device according to claim 1, wherein the sliding circuit board module has two second positioning bumps, the frame further has two positioning holes, and when the sliding circuit board module slides into the receiving space, the second positioning bumps are embedded into corresponding positioning holes for positioning the sliding circuit board module.

7. The display device according to claim 1, wherein the frame further has a testing through hole for exposing a third connecting port of the circuit board, and the third connecting port is electrically connected to a testing signal source.

8. An electronic device, comprising:
at least a circuit board, comprising a plurality of electronic components;
a display panel having a display side and a back side corresponding to the display side;
a frame disposed on the back side of the display panel comprising a receiving space, an opening for exposing the electronic components, and a positioning hole;
a sliding circuit board module used for carrying the circuit board, comprising a bottom board for carrying the circuit board, wherein the sliding circuit board module is movably coupled with the frame, such that the sliding circuit board module can slide both inside and outside of the receiving space via the opening, the sliding circuit board module slides outside of the receiving space via the opening for exposing the electronic components, the sliding circuit board module has a sliding direction parallel to a surface of the display side of the display panel; and the circuit board and the bottom board are substantially parallel to the surface of the display side of the display panel.

9. The electronic device according to claim 8, wherein the circuit board further comprises a power circuit board and an image circuit board, the sliding circuit board module further comprises a lateral board coupled with the bottom board, the lateral board further has a first lateral board through hole for exposing a first connecting port of the circuit board and a second lateral board through hole for exposing a second connecting port of the circuit board, the first lateral board through hole is coupled with the power circuit board, and the second lateral board through hole is coupled with the image circuit board.

10. The electronic device according to claim 8, further comprising:
a sliding mechanism disposed between the frame and the sliding circuit board module, such that the sliding circuit board module slides with respect to the frame.

11. The electronic device according to claim 8, wherein the frame further has a testing through hole for exposing a third connecting port of the circuit board, and the third connecting port is electrically connected to a testing signal source.

12. The display device according to claim 1, further comprising:
two slide tracks engaged with two opposite sides of the frame, wherein each slide track further has a first positioning bump, the sliding circuit board module has two second positioning bumps, the frame further has two positioning holes, and when the slide tracks are engaged with the frame and the sliding circuit board module slides into the receiving space, one of the first positioning bumps and one of the second positioning bumps are embedded into one of the corresponding positioning holes.

13. The electronic device according to claim 1, further comprising a plurality of electronic components disposed on the power circuit board and the image circuit board, wherein the electronic components are facing opposite to the sliding circuit board module.

14. The electronic device according to claim 8, wherein the circuit board further comprises a power circuit board and an image circuit board, the electronic components are disposed on the power circuit board and the image circuit board, wherein the electronic components are facing opposite to the sliding circuit board module.

15. The electronic device according to claim 8, further comprising:
two slide tracks, the two slide tracks engaged with two opposite sides of the frame, wherein each slide track further has a first positioning bump;
wherein the sliding circuit board module comprises two second positioning bumps, and one of the first positioning bumps and one of the second positioning bumps are embedded into the positioning hole when the slide tracks are engaged with the frame and the sliding circuit board module slides into the receiving space.

16. The electronic device according to claim 15, wherein each slide track has a sliding slot, and the sliding circuit board module is embedded into the sliding slots, such that the sliding circuit board module slides along the slide tracks.

17. The electronic device according to claim 16, wherein each slide track has at least an engaging hook, the frame has at least two engaging holes, and each engaging hook is engaged with a corresponding engaging hole, such that the slide tracks are engaged with the frame.

* * * * *